(12) United States Patent
Chang et al.

(10) Patent No.: US 8,489,590 B2
(45) Date of Patent: Jul. 16, 2013

(54) CROSS-MARKET MODEL ADAPTATION WITH PAIRWISE PREFERENCE DATA

(75) Inventors: Yi Chang, Santa Clara, CA (US); Zhaohui Zheng, Mountain View, CA (US); Fernando David Diaz, San Francisco, CA (US); Jing Bai, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 148 days.

(21) Appl. No.: 12/966,983

(22) Filed: Dec. 13, 2010

(65) Prior Publication Data
US 2012/0150855 A1 Jun. 14, 2012

(51) Int. Cl.
G06F 7/00 (2006.01)
G06F 17/30 (2006.01)

(52) U.S. Cl.
USPC .......................................... 707/728; 707/705

(58) Field of Classification Search
None
See application file for complete search history.

(56) References Cited

U.S. PATENT DOCUMENTS

| | | | |
|---|---|---|---|
| 2004/0024745 A1* | 2/2004 | Jeng et al. ........................ | 707/2 |
| 2004/0255282 A1* | 12/2004 | Eruhimov et al. ............ | 717/151 |
| 2008/0014646 A1* | 1/2008 | Kuroda et al. ................. | 436/89 |
| 2008/0059508 A1* | 3/2008 | Lu et al. ........................ | 707/102 |
| 2008/0208836 A1* | 8/2008 | Zheng et al. ..................... | 707/5 |
| 2008/0301069 A1* | 12/2008 | Chen et al. ..................... | 706/12 |
| 2009/0106232 A1* | 4/2009 | Burges et al. .................... | 707/5 |
| 2009/0198671 A1* | 8/2009 | Zhang et al. ..................... | 707/5 |
| 2009/0248595 A1* | 10/2009 | Lu et al. ......................... | 706/12 |
| 2009/0276414 A1* | 11/2009 | Gao et al. ........................ | 707/5 |
| 2009/0319507 A1* | 12/2009 | Chen et al. ...................... | 707/5 |
| 2010/0125570 A1* | 5/2010 | Chapelle et al. .............. | 707/722 |
| 2010/0153315 A1* | 6/2010 | Gao et al. ........................ | 706/12 |
| 2010/0185623 A1* | 7/2010 | Lu et al. ........................ | 707/748 |
| 2010/0299350 A1* | 11/2010 | Konig et al. .................. | 707/769 |
| 2011/0191276 A1* | 8/2011 | Cafarella et al. ................ | 706/12 |
| 2011/0231380 A1* | 9/2011 | Sadagopan et al. ........... | 707/706 |
| 2011/0264518 A1* | 10/2011 | Liu et al. .................... | 705/14.49 |
| 2012/0102018 A1* | 4/2012 | Yang et al. .................... | 707/709 |
| 2012/0117007 A1* | 5/2012 | Agrawal et al. ................ | 706/12 |

OTHER PUBLICATIONS

Bai et al., Cross-market Model Adaptation With Pairwise Preference Data for Web Search Ranking, Aug. 2010, Association for Computational Linguistics, pp. 18-26.*
Amini, M.-R. et al.; A Boosting Algorithm for Learning Bipartite Ranking Functions with Partially Labeled Data; SIGIR '08: Proceedings of the 31st Annual International ACM SIGIR Conference on Research and Development in Information Retrieval; 8 pages; 2008.

(Continued)

*Primary Examiner* — Wilson Lee
*Assistant Examiner* — Jessica N Le
(74) *Attorney, Agent, or Firm* — Berkeley Law & Technology Group, LLP

(57) ABSTRACT

Embodiments are directed towards generating market-specific ranking models by leveraging target market specific pairwise preference data. The pairwise preference data includes market-specific training examples, while a ranking model from another market captures the common characteristics of the resulting ranking model. In one embodiment, the ranking model is trained by applying a Tree Based Ranking Function Adaptation (TRADA) algorithm to multi-grade labeled training data, such as editorially generated training data. Then, contradictions between the TRADA generated ranking model and target-market specific pairwise preference data are identified. For each identified contradiction, new training data is generated to correct the contradiction. Then, in one embodiment, an algorithm such as TRADA is applied to the existing ranking model and the new training data to generate a new ranking model.

20 Claims, 6 Drawing Sheets

OTHER PUBLICATIONS

Bacchiani, M. et al.; Unsupervised Language Model Adaptation; CASSP '03: Poceedings of the International Conference on Acoustics, Speech and Signal Processing; 4 pages; 2003.

Bai, J. et al.; Multi-Task Learning for Learning to Rank in Web Search; CIKM '09: Proceeding of the 18th ACM Conference on Information and Knowledge Management; 4 pages, 2009.

Blitzer, J. et al; Domain Adaptation with Structural Correspondence Learning; EMNLP '06: Proceedings of the 2006 Conference on Empirical Methods on Natural Language Processing; 9 pages; 2006.

Burges, C. et al.; Learning to Rank using Gradient Descent; ICML '05: Proceedings of the 22nd International Conference on Machine Learning; 8 pages; 2005.

Cao, Z. et al; Learning to Rank: From Pairwise Approach to Listwise Approach; ICML '07: Proceedings of the 24th International Conference on Machine Learning; 9 pages; 2007.

Chen, D. et al.: TransRank: A novel algorithm for transfer of rank learning; ICDM workshop '08: Proceeding of IEEE Conference on Data Mining; 10 pages; 2008.

Chen, K. et al.; Trada: Tree Based Ranking Function Adaptation; CIKM '08: Proceeding of the 17th ACM Conference on Information and Knowledge Management; 10 pages; 2008.

Chen, W. et al; Ranking Measures and Loss Functions in Learning to Rank; NIPS '08: Proceedings of the Twenty-Second Annual Conference on Neural Information Processing Systems; 9 pages; 2008.

Chen, K. et al.; On Domain Similarity and Effectiveness of Adapting-to-Rank; CIKM '09: Proceeding of the 18th ACM Conference on Information and Knowledge Management; pp. 1601-1604; 2009.

Dong, A. et al.; Empirical Exploitation of Click Data for Query-Type-Based Ranking; EMNLP '09: Proceedings of the 2009 Conference on Empirical Methods on Natural Language Processing; 10 pages; 2009.

Duh, K. et al.; Learning to Rank with Partially-Labeled Data; SIGIR '08: Proceedings of the 31st Annual International ACM SIGIR Conference on Research and Development in Information Retrieval; 8 pages; ACM; 2008.

Freund, Y. et al.; An Efficient Boosting Algorithm for Combining Preferences; ICML '98: Proceedings of the Fifteenth International Conference on Machine Learning; 37 pages; 1998.

Friedman, J. H.; Greedy Function Approximation: A Gradient Boosting Machine; The Annals of Statistics; vol. 29 No. 5; 34 pages; 2001.

Gao, J. et al; Model Adaptation via Model Interpolation and Boosting for Web Search Ranking; EMNLP '09: Proceedings of the 2009 Conference on Empirical Methods on Natural Language Processing; pp. 505-513 2009.

Geng, B. et al.; Ranking Model Adaptation for Domain-Specific Search; CIKM '09: Proceeding of the 18th ACM Conference on Information and Knowedlge Management; pp. 197-206; 2009.

Hwa, R.; Supervised Grammar Induction using Training Data with Limited Constituent Information; ACL '99: Proceedings of the Conference of the Association for Computational Linguistics; 7 pages; 1999.

Järvelin, K. et al.; Cumulated Gain-Based Evaluation of IR Techniques; ACM Treansactions on Information Systems, vol. 20, No. 4; pp. 422-446; 2002.

Joachims, T. et al.; Accurately Interpreting Clickthrough Data as Implicit Feedback; SIGIR '05; 8 pages; 2005.

Joachims, T.; Optimizing Search Engines using Clickthrough Data; KDD '02: Proceedings of the eighth ACM SIGKDD International conference on Knowledge Discovery and Data Mining; pp. 133-142; ACM Press; 2002.

Liu, T.Y.; Learning to Rank for Information Retrieval; Now Publishers; pp. 226-331; 2009.

Radlinski, F. et al.; Minimally Invasive Randomization for Collecting Unbiased Preferences from Clickthrough Logs; 7 pages; 2006.

Radlinski, F. et al.; Active Exploration for Learning Rankings from Clickthrough Data; KDD '07; 10 pages; 2007.

Wu, M. et al.; Smoothing DCG for Learning to Rank: A Novel Approach Using Smoothed Hinge Functions; CIKM '09: Proceeding of the 18th ACM Conference on Information and Knowledge Management; 4 pages; 2009.

Xia, F. et al.; Listwise Approach to Learning to Rank—Theory and Algorithm; ICML '08: Proceedings of the 25th International Conference on Machine Learning; 8 pages; 2008.

Xu, J. et al.; Directly Optimizing Evaluation Measures in Learning to Rank; SIGIR '08: Proceedings of the 31st Annual International ACM SIGIR Conference on Research and Development in Information Retrieval; 8 pages; 2008.

Zheng, Z. et al.; A Regression Framework for Learning Ranking Functions Using Relative Relevance Judgments; SIGIR '07: Proceedings of the 30th Annual International ACM SIGIR Conference on Research and Development in Information Retrieval; pp. 287-294; ACM; 2007.

* cited by examiner

CROSS-MARKET MODEL ADAPTATION WITH PAIRWISE PREFERENCE DATA

TECHNICAL FIELD

The present invention relates generally to machine-learned ranking techniques and, more particularly, but not exclusively, to employing a modified pairwise tree adaptation algorithm to adjust a first market trained ranking model to a target market using target specific pairwise preference data.

BACKGROUND

Search algorithms provide methods for ranking a web scale collection of documents given a short query. The success of these algorithms often relies on the rich set of document properties or features and the complex relationships between them. Increasingly, machine learning techniques are being used to learn these relationships for an effective ranking function.

One of the fundamental problems for a web search engine is the development of ranking models for different markets. While the approach of training a single model for all markets is attractive, it may fail to fully exploit specific properties of the markets. On the other hand, the approach of training market specific models often requires a huge overhead related to acquiring a large training set for each market.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
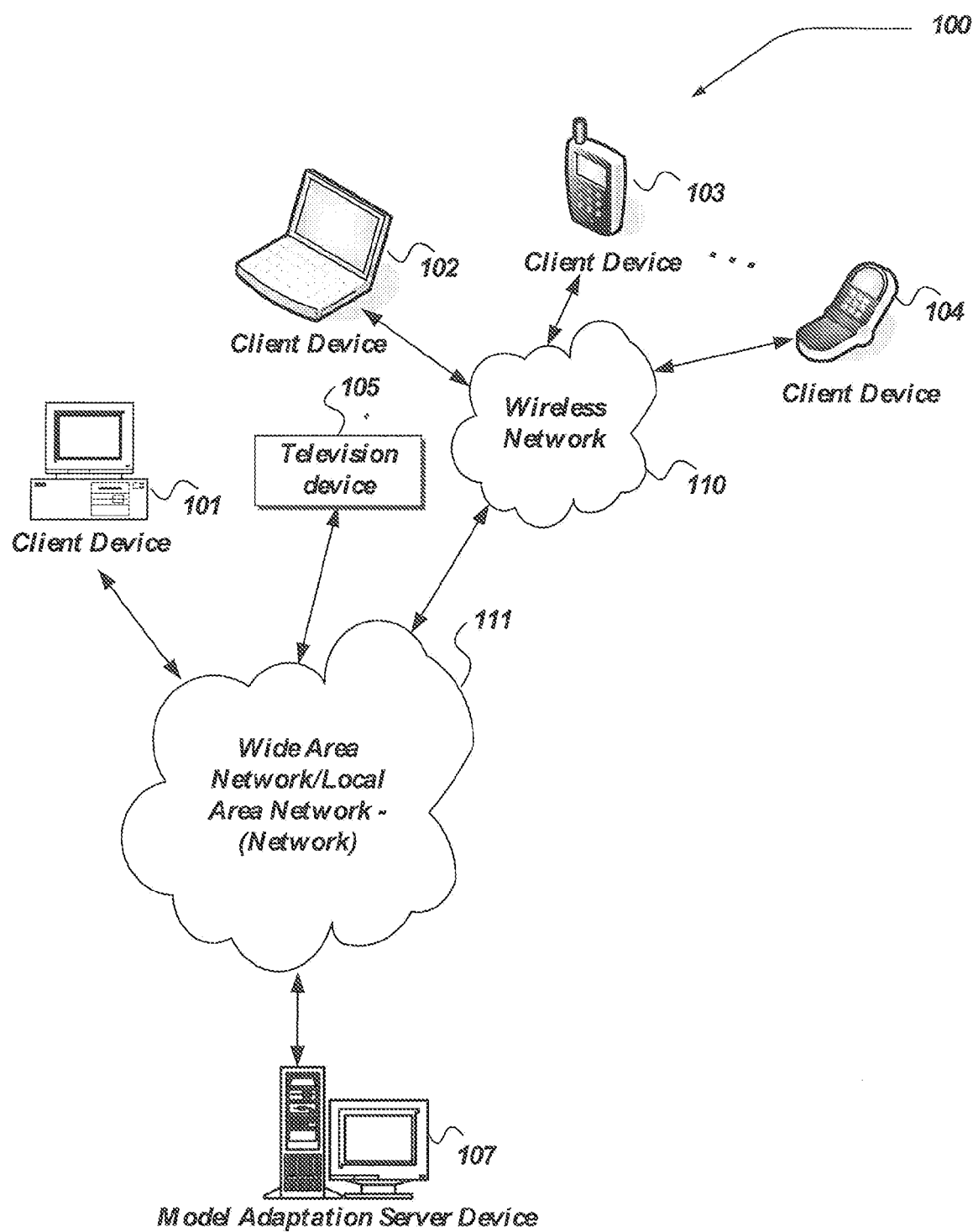
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term 'document' refers to a collection of text, images, structured user profiles, or other retrievable item storable in memory or on a physical storage medium. In one embodiment, a document conforms to a set of rules, such as HTML, that define how text and/or images may be displayed, although documents may not have any such structure. Additional types of documents are also considered, including documents created by applications such as word processors, spread-sheets, databases, and the like.

As used herein, the term 'market' refers to a collection of end-users that share a common characteristic. For example, a market may include users located within a same geographical region, such as the same country, state, city, or the like. Additionally or alternatively, a market may include users that speak a common language or that visit a particular website or set of websites. Additionally or alternatively, a market may include users of a particular demographic, such as age, political affiliation, search history, search preferences, and the like. Additionally or alternatively, a market may be self selected, in that users may choose, explicitly or implicitly, whether to join a market. Moreover, a market may be defined by any combination of the above characteristics.

As used herein, the term 'base market' refers to a market for which a trained search model exists and upon which a search model for a target market is to be inferred based on pairwise relevance training data. Typically, a base market is larger than a target market. However, a market may be considered a base market if the amount of training data associated with the base market is greater than the amount of training data associated with the target market. In one embodiment, a base market may include human edited absolute training data for that market, while relative training data is available for the target market.

As used herein, 'relevance data' refers to judgments about the relevance of a document to a given search query or search term. As used herein, the term 'training data' refers to one or more judgments about the relevance of one or more documents to one or more search queries. In other words, training data refers to a plurality of judgments about document relevance. Training data may be absolute or relative.

As used herein, 'absolute training data' refers to one or more absolute judgments as to the relevance of a document to a given search query or search term. Absolute judgments may be made on a numeric scale, such as a scale of 1 through 10, or judgments may be made on a non-numeric scale such as 'high', 'medium', and 'low' relevance. In another embodiment, absolute relevance judgments may be binary. In one embodiment, absolute judgments may be made by individuals who are experts in a particular field. For example, a medical doctor may be hired to make an absolute judgment as to the relevance of medical research documents for a given search query or search term.

As used herein, 'relative training data' refers to one or more relative rankings of document relevance for a given search query or search term. In other words, relative training data is an ordering of documents based on relevance for a given search query or search term. Relative judgments may be pairwise, in which case each ranking include two documents, a search query/term, and an indication of which document is more relevant for the search query/term. Relative training data may be determined by human experts. Additionally or alternatively, relative training data may be inferred from behavioral preference feedback, for example click-through statistics generated by end-users. In one embodiment, click-through statistics may indicate that a particular document was preferred by users, in that users clicked on a link to that document more, than to another document. Click-through statistics may be generated based on search results, advertisements, or any other type of content.

As used herein, 'contradiction' between a search model and relative training data refers to a situation when the search model predicts a first document is more relevant than a second document for a given search query, while the relative training data indicates that the second document is more relevant than the first for the same given search query.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards generating market-specific ranking models by leveraging target market specific pairwise preference data. The pairwise preference data includes market-specific training examples, while a ranking model from another market captures the common characteristics of the resulting ranking model. In one embodiment, the ranking model is trained by applying a Tree Based Ranking Function Adaptation (TRADA) algorithm to multi-grade labeled training data, such as editorially generated training data. Then, contradictions between the TRADA generated ranking model and target-market specific pairwise preference data are identified. For each identified contradiction, new training data is generated to correct the contradiction. Then, in one embodiment, an algorithm such as TRADA is applied to the existing ranking model and the new training data to generate a new ranking model.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 111, wireless network 110, client devices 101-105, and model adaptation server device 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, model adaptation server device 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Model Adaptation Server Device (MASD) 107 may be configured to receive search requests. MASD 107 may then provide to one or more of client devices 101-105 rank ordered search results using a target model that was generated based at least in part on market specific pairwise relevance training data, as discussed below in conjunction with FIG. 4.

In one embodiment, MASD 107 includes virtually any network device usable to operate as website servers to provide content to client devices 101-105. Such content may include, but is not limited to webpage content, advertisements, professionally generated content, search results, blogs, and/or photograph sharing pages for access by another client device. Model adaptation server device 107 may also operate as a messaging server such as an SMS message service, IM message service, email message service, alert service, or the like. Moreover, model adaptation server device 107 may also operate as a File Transfer Protocol (FTP) server, a database server, music and/or video download server, or the like. Additionally, model adaptation server device 107 may be configured to perform multiple functions.

Devices that may operate as MASD 107 include various network devices, including, but not limited to personal computers, desktop computers, multiprocessor systems, microprocessor-based or programmable consumer electronics, network PCs, server devices, network appliances, and the like. Moreover, while MASD 107 is illustrated as a single device, the invention is not so limited—MASD 107 could be a plurality of network devices using a cloud architecture, peer-to-peer architecture, or any other architecture. Also, while FIG. 1 teaches one embodiment of the invention in which a client submits a search request to a separate server device, model adaptation may also be employed when the device requesting the search is also the device performing the search. For example, client device 103 may index files stored locally on a memory device. A user of client device 103 may initiate a search of the indexed files, wherein the search applies model adaptation as discussed herein. Thus, the invention is not to be construed as being limited to any particular architecture.

Illustrative Client Device

Figure 2:
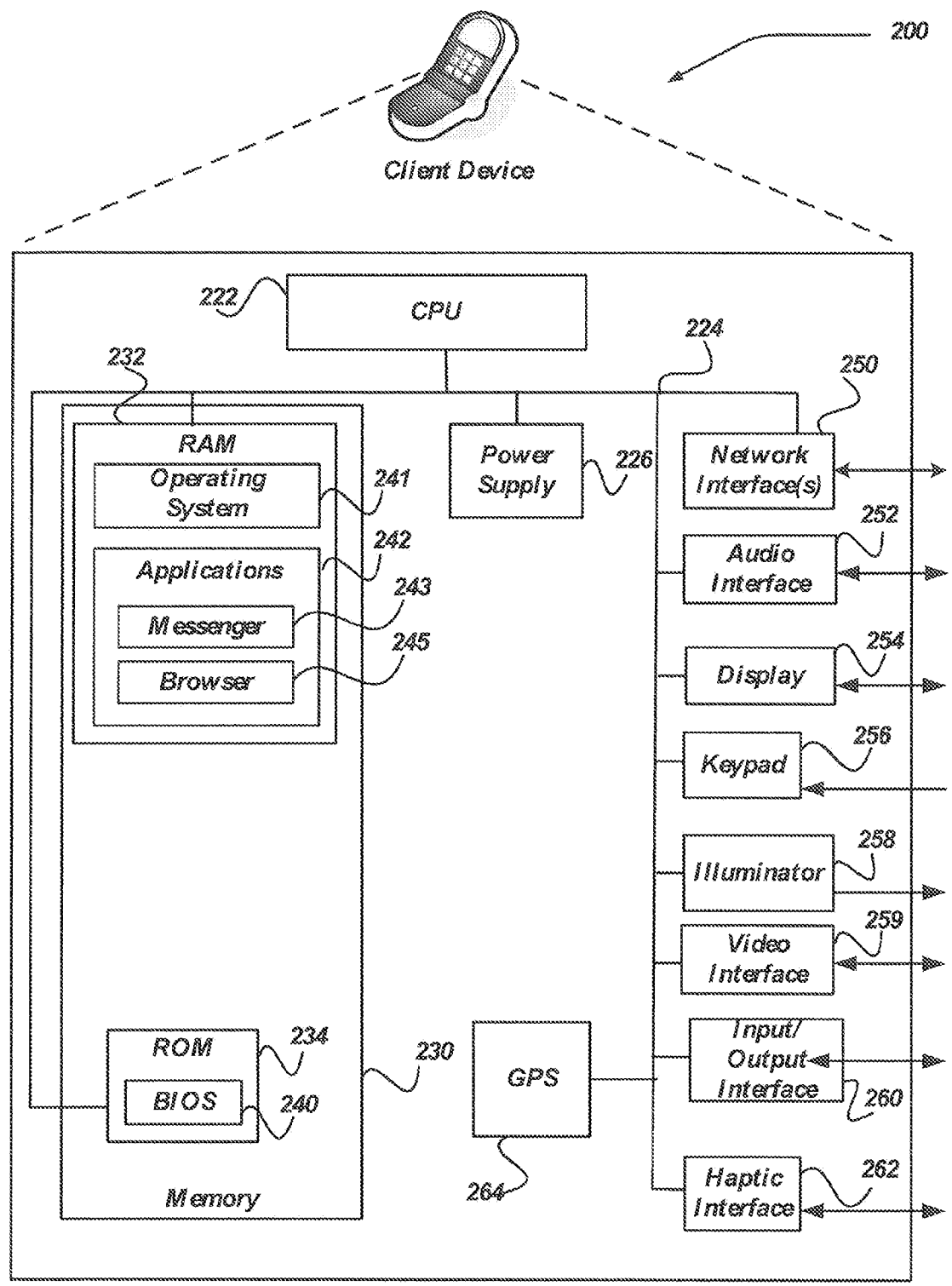
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive user generated content including messages and/or other documents between another computing device for posting, reading, and/ or otherwise communicating with another client device. In one embodiment, browser 245 may enable a user to submit a search query and to display search results.

Messenger 243 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like.

Illustrative Network Device

Figure 3:
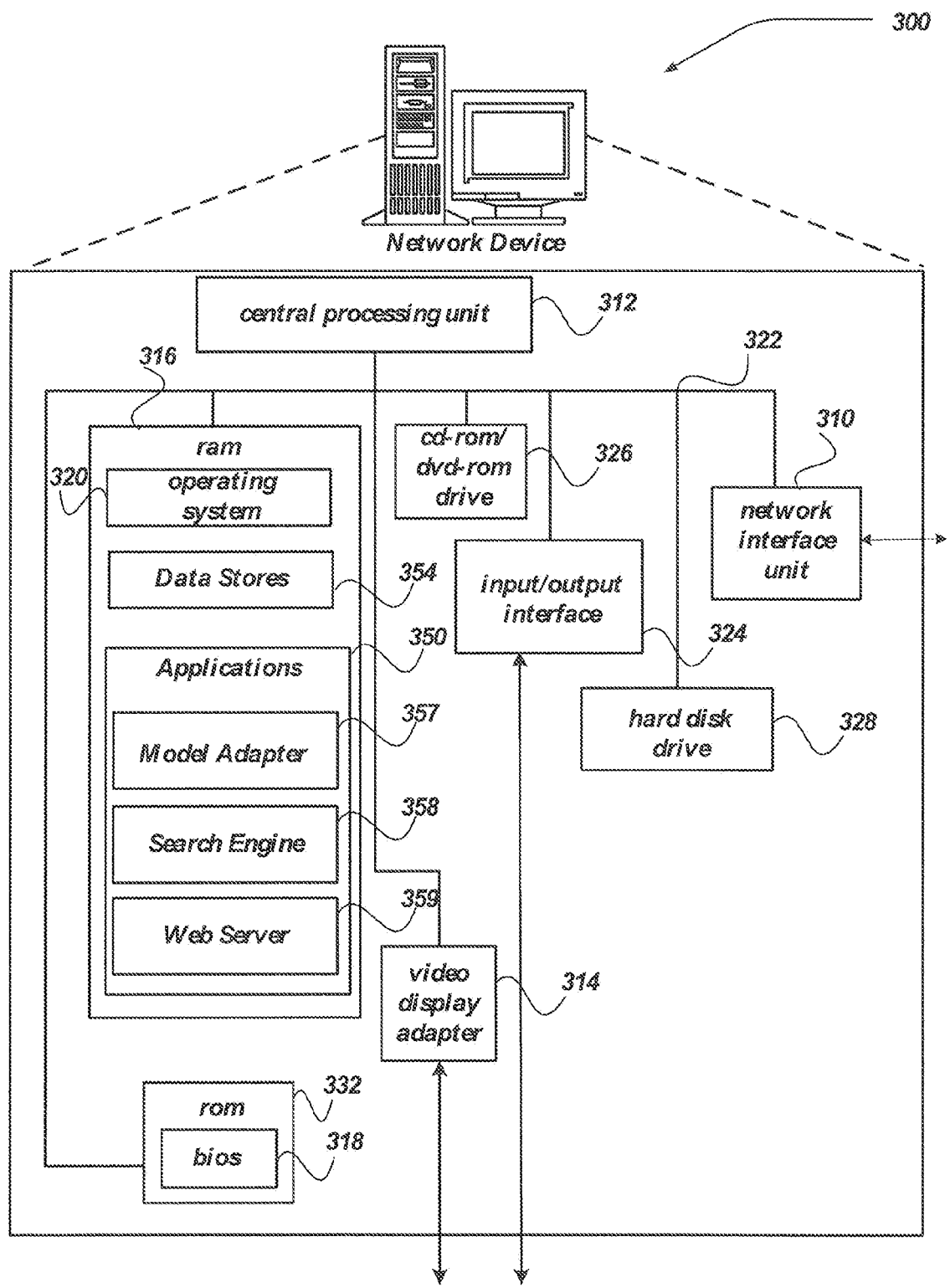
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, MASD 107 of FIG. 1. As described below, network device 300 may further include a capability to adapt a model used to rank search results, wherein the model was generated based, in one embodiment, on training data derived from editorial labels of document relevance, and wherein the model is adapted using target market specific pairwise preference data.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical storage medium which can be used to store the desired information and which can be accessed by a computing device.

As shown, data stores 354 may include a database, text, spreadsheet, folder, file, or the like, that may be configured to maintain and store ranking models, training data, and the like. In one embodiment, storage of such information may be based on a specific market, such as a geographical market, demographic market, or any other association of training data. Data stores 354 may further include program code, data, algorithms, and the like, for use by a processor, such as central processing unit (CPU) 312 to execute and perform actions. In one embodiment, at least some of data store 354 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Model adapter 357, search engine 358, and Web services 359 may also be included as application programs within applications 350.

Web services 359 represent any of a variety of services that are configured to provide content, including messages, over a network to another computing device. Thus, web services 359 include for example, a web server, a File Transfer Protocol (FTP) server, a database server, a content server, or the like. Web services 359 may provide the content including messages over the network using any of a variety of formats, including, but not limited to WAP, HDML, WML, SMGL, HTML, XML, cHTML, xHTML, or the like.

Model adapter 357 is configured to receive a ranking model from a market. In one embodiment, the received ranking model was generated based on absolute multi-grade labeled training data, such as editorially generated data. In another embodiment, model adapter 357 may receive and operate on a model based on pairwise preference data, absolute multi-grade labeled training data that has been modified by pairwise preference data, or any combination thereof. In one embodiment, model adapter 357 also receives pairwise preference data associated with a target market. In one embodiment, pairwise preference data comprises tuples of relevance data, where each tuple includes a relative rank ordering of documents for a given search query. Model adapter 357 may then derive a ranking model based on the received ranking model and the received pairwise preference data associated with the target market, as is described below in conjunction with FIG. 4.

In one embodiment, Web services 359 may receive search requests from another network device, such as client device 200, or the like. Web services 359 may then request that search engine 358 perform a search and transmit the search results to the requesting client. Search engine 358 may receive a search request, and in response, utilize a model adapter such as model adapter 357 to generate ranked search results.

Generalized Operation

Figure 4:
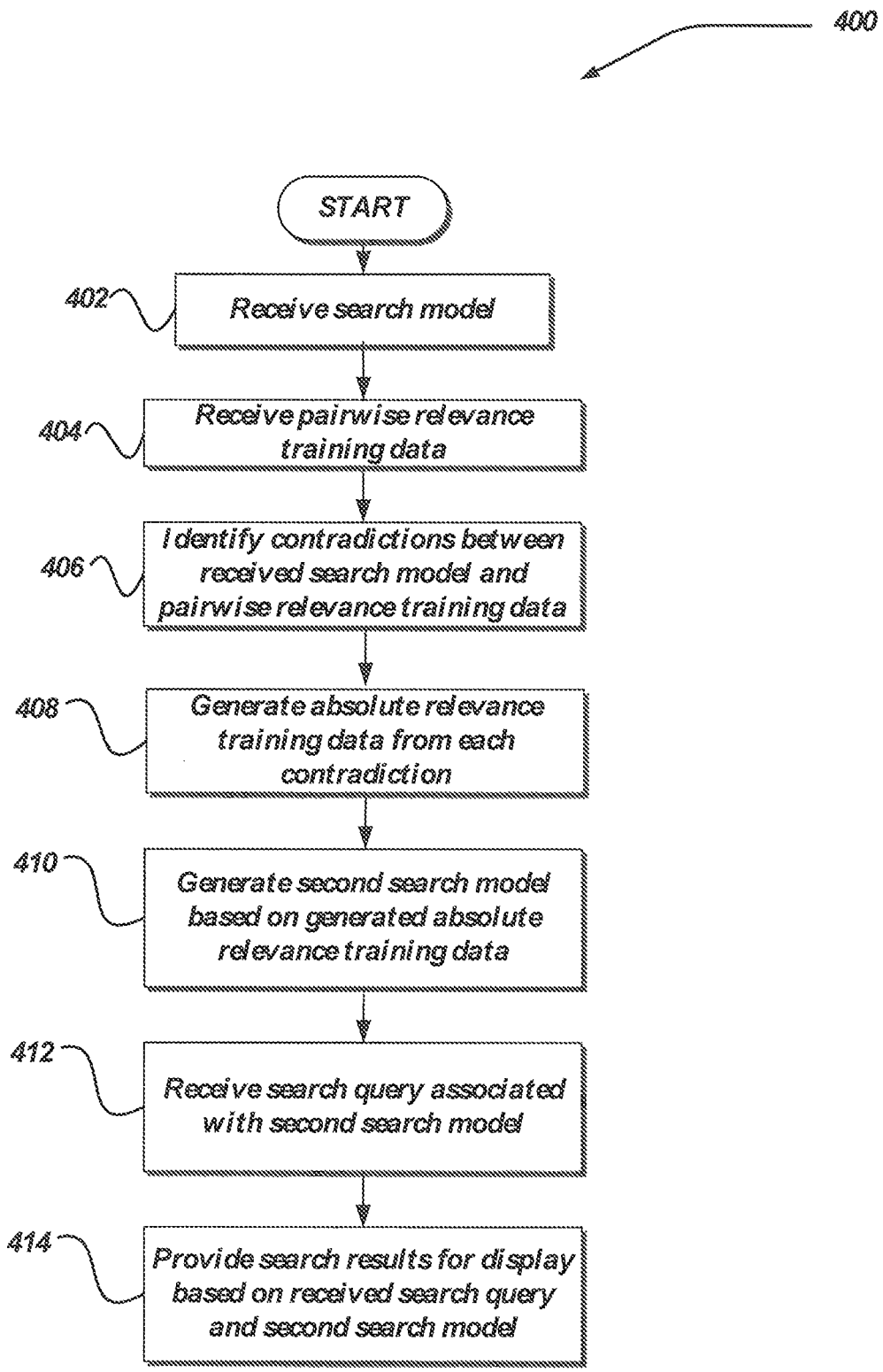
FIG. 4 illustrates a logical flow generally showing one embodiment of an overview process for use in adapting a search model using pairwise relevance training data for a different target market.

The operation of certain aspects of the invention will now be described with respect to FIG. 4. FIG. 4 illustrates a logical flow generally showing one embodiment of an overview process for use in generating market-specific ranking models by leveraging pairwise preference data associated with the target market.

Process 400 begins, after a start block, at block 402, where a search model associated with a base market is received. In one embodiment, the received search model has been trained for a large market, such as for the United States or an English speaking world. However, markets of any size are contemplated.

In one embodiment, the search model includes a gradient boosted decision tree (GBDT) which models the relationship between features in a document, search queries/terms, and document relevance as a decision tree. Given a search query and a document, the GBDT can be used to predict the relevance grade of the document. By comparing relevance grades of different documents for the same query, a ranking is determined. Search models based on approaches other than a GBDT are also contemplated, including a variety of other regression analysis tools usable for performing classification of content.

In one embodiment, a GBDT is inferred based on set of training data. Training data may include multi-grade labeled training data, such as editorially generated training data. However, other methods of training data include automated mechanisms, crowd-sourcing, and the like. In any case, multi-grade labeled training data associates an absolute relevance value to a document for a given query. Thus, a training set D from which a GBDT is inferred may be defined as $D=\{<(q,d), y>_1, \ldots <(q,d), y>_n\}$, where $<(q, d), y>_i$ encodes the labeled relevance, y, of a document d, given query q. Each query-document pair, (q, d), is represented by a set of features, $(q, d)=\{x_{i1}, x_{i2}, x_{i3}, \ldots, x_{im}\}$. These features include, for example, query-document match features, query-specific features, and document specific features. An example of a GBDT is described below in conjunction with FIG. 6.

Flowing next to block 404, pairwise relevance training data associated with a target market is received. In one embodiment, the target market is at least partially distinct from the base market, although the markets could be the same or partially overlap. In one embodiment, the target market has fewer users than the base market. For example, the base market may be a geographical market of the United States, while the target market is Hong Kong.

In one embodiment, pairwise relevance training data comprises a set of relative judgments preferring one document over another. Preference data is attractive for several reasons. Editors can often more easily determine preference between documents than the absolute grade of single documents. Relevance grades can often vary between editors. Some editors may tend to overestimate relevance compared to another editor. As a result, judgments need to be resealed for editor biases. Although preference data is not immune to inter-editor inconsistency, absolute judgments introduce two potential sources of noise: determining a relevance ordering and determining a relevance grade. Even if grades can be accurately labeled, mapping those grades to real values is often done in a heuristic or ad hoc manner. Generating a GBDT based on absolute judgments potentially wastes modeling effort on predicting the grade of a document as opposed to focusing on optimizing the rank order of documents, the real goal a search engine. Also, preference data can often be mined from a production system using assumptions about user clicks.

In any event, at block 406, a set of contradictions between the received model and the received pairwise relevance training data is determined. In one embodiment, each relative judgment of the received pairwise relevance training data includes a query, two documents, and a preference for one of the two documents. A contradiction exists when the preference indicated in the relative judgment is not implied by the received model. For example, if document D1 is preferred to document D2, yet the received model yields an absolute judgment of 3.5 for D1 and 4 for D2, there is a contradiction between the received model and the relative judgment.

At block 408, absolute relevance training data is generated based on the set of contradictions. In one embodiment, for each contradiction between a relative judgment of the received pairwise relevance training data and the received model, a new absolute judgment based on a modification of the absolute judgment implied by the received model is generated. Continuing the example of D1 and D2 above, by adding 1 to the absolute judgment of D1, or by subtracting 1 from the absolute value of D2, D1 will be 0.5 greater than D2, consistent with the relative judgment that D1 is preferred to D2.

At block 410, a second search model is generated based on the absolute relevance training data generated in block 408. In one embodiment the second search model is generated using the TRADA algorithm described in conjunction with FIG. 5, although any method of generating a search model based on absolute relevance judgments may be employed. In one embodiment, the second search model comprises a search model for a target market at least partially distinct from the market for which the received search model was trained.

At block 412, a search query associated with the second search model is received, and a search engine evaluates the second search model to generate a set of ranked search results.

At block 414, the results of the search query are provided for display by the device that provided the search query.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Figure 5:
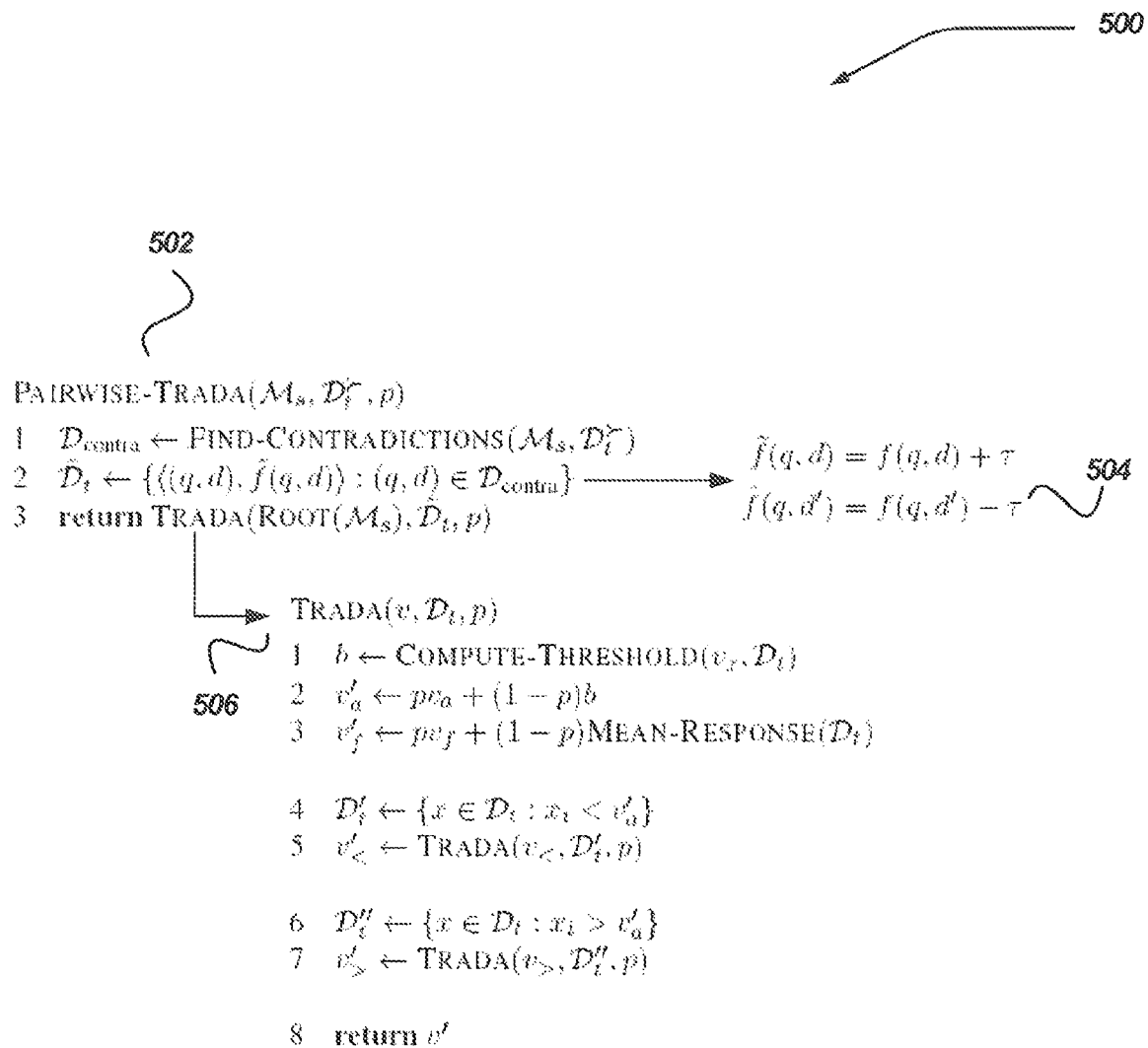
FIG. 5 illustrates one non-limiting example of a tree adaptation algorithm that may, in one embodiment, be used to adapt a ranking model.

FIG. 5 illustrates algorithms 500 that may in one embodiment be used to adapt a search model to pairwise relevance training data. Pairwise TRADA 502 illustrates one embodiment of the process described above in FIG. 4, particularly with regard to blocks 402, 404, 406, and 408. In pairwise TRADA 502, $M_s$ refers to a base model, including one or more trees derived from absolute or relative judgments of the base model. $D_t$ refers to relative training data derived from a target market, and p refers to a trustworthiness threshold of the base model.

Algorithm 504 illustrates one embodiment of the process described above in FIG. 4 for generating modified absolute relevance values. In algorithm 502, v refers to a node in a base model, such as a root node. $D_t$ refers to absolute relevance training data derived from a target market, and p refers to a trustworthiness threshold of the base model. Algorithm 506 illustrates a known algorithm for inferring one or more Gradient Boosted Decision Trees (GBDT) given a set of absolute relevance judgments.

EXAMPLE MODEL

Figure 6:
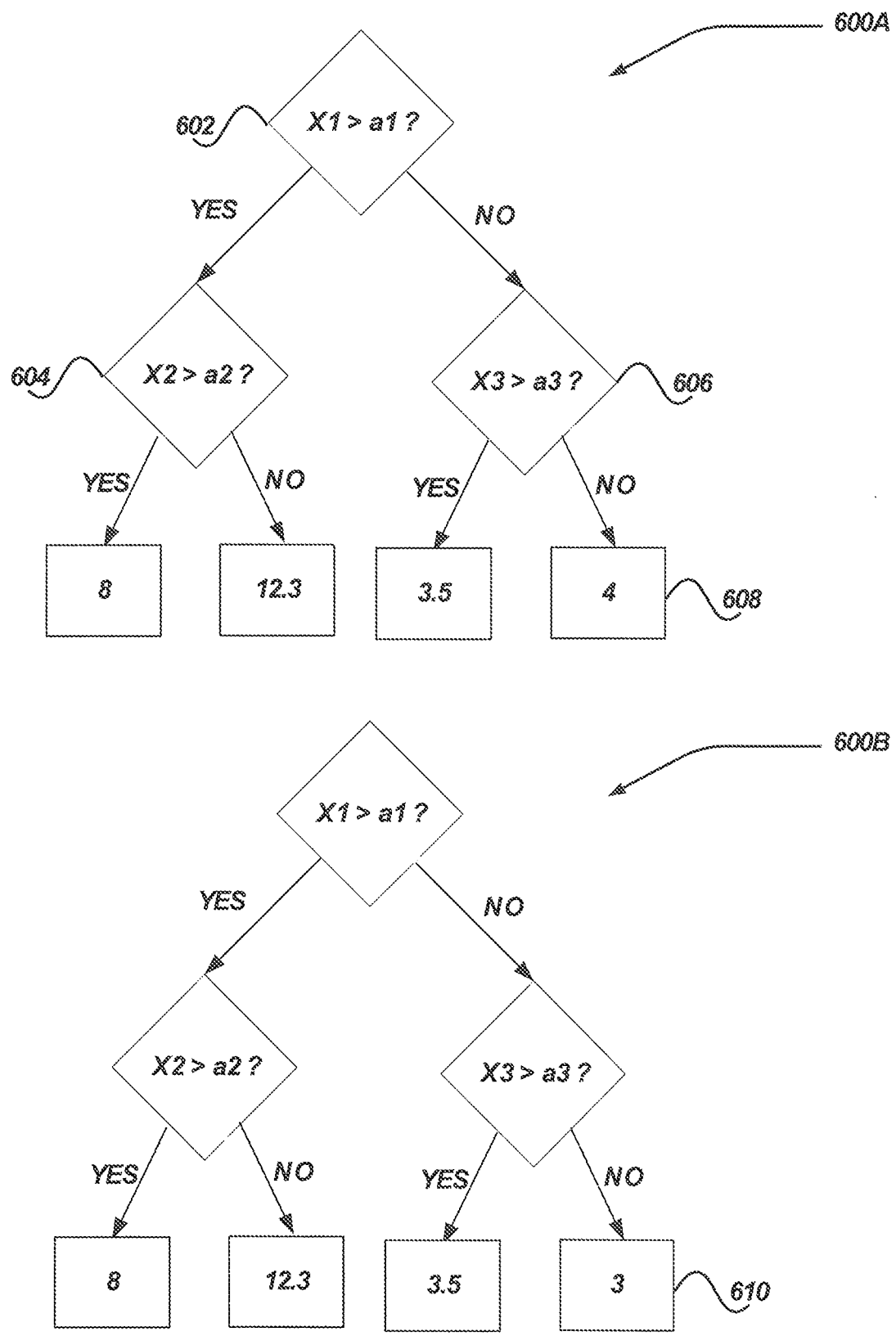
FIG. 6 illustrates a non-limiting, non-exhaustive example of a tree model before and after adaptation.

FIG. 6 illustrates a non-limiting, non-exhaustive example of a model before 600A and after 600B adaptation. In one embodiment, the model is associated with a query. Although only a single GBDT is shown, a model may contain multiple GBDTs for a given query, where the prediction of a document's relevance for the query is calculated by summing the predictions of each GBDT.

In this model, each of nodes 602, 604, and 606 contain a decision comparing a feature of the document and a splitting value (a1, a2, a3), where each of the splitting values are determined by an algorithm such as TRADA 506. Block 608 represents a value predicting the relevance of a document for this query. After adapting the model, as discussed above in conjunction with FIG. 4, the resulting prediction value of a document may be modified, as illustrated in block 610.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, the network device comprising:
   a transceiver to send and receive data over a network; and
   a processor that is operative on the received data to perform actions, including:
      receiving a base search model associated with a base market;
      receiving pairwise relevance training data associated with a target market;
      identifying one or more contradictions between the received search model and the received pairwise relevance training data;
      generating absolute relevance training data based on the identified contradictions;
      generating another search model based on the base search model and the generated absolute relevance training data; and
      generating a rank ordered search query result based on a received search query and the generated other search model.

2. The network device of claim 1, wherein a market comprises a grouping of end users having a shared characteristic.

3. The network device of claim 1, wherein the base search model comprises one or more Gradient Boosted Decision Trees (GBDT) derived from a set of absolute judgments.

4. The network device of claim 1, wherein generating absolute relevance training data includes evaluating the base search model for a document and modifying the result.

5. The network device of claim 1, wherein the base search model is derived from a set of absolute judgments ascribing a value to a document for a given search query.

6. The network device of claim 1, wherein identifying one or more contradictions further comprises:
   identifying a pair of documents in the pairwise relevance data wherein the relevance of the same pair of documents implied by the base search model is different from the relevance of the pair of documents indicated by the pairwise relevance data.

7. The network device of claim 1, wherein the received base search model is derived from query document pairs, each query document pair being associated with an absolute relevance judgment provided by a human editor.

8. A system, the system comprising:
   a non-transitory computer-readable storage device configured to store one or more search models; and
   one or more network devices in communication with the non-transitory computer-readable storage device and operable to perform actions, comprising:
      receiving a base search model associated with a base market from the non-transitory computer-readable storage device;
      receiving pairwise relevance training data associated with a target market;
      identifying one or more contradictions between the received search model and the received pairwise relevance training data;
      generating absolute relevance training data based on the identified contradictions;
      generating another search model based on the base search model and the generated absolute relevance training data; and
      generating a rank ordered search query result based on a received search query and the generated other search model.

9. The system of claim 8, wherein a market comprises a grouping of end users based on geography, demographics, search history, or search preferences.

10. The system of claim 8, wherein the base search model comprises one or more Gradient Boosted Decision Trees (GBDT) derived from a set of relative judgments.

11. The system of claim 8, wherein generating absolute relevance training data includes evaluating the base search model for a document and modifying the result.

12. The system of claim 8, wherein identifying one or more contradictions further comprises:
   identifying a pair of documents in the pairwise relevance data wherein the relevance of the same pair of documents implied by the base search model is different from the relevance of the pair of documents indicated by the pairwise relevance data.

13. The system of claim 8, wherein the received base search model is derived from query document pairs, each query document pair being associated with an absolute relevance judgment provided by a human editor.

14. A non-transitory computer-readable storage device having computer-executable instructions, the computer-executable instructions when installed onto a computing device enable the computing device to perform actions, the actions comprising:
   receiving a search query from a client device;
   receiving a base search model associated with a base market;
   receiving pairwise relevance training data associated with a target market associated with the client device;
   identifying one or more contradictions between the received search model and the received pairwise relevance training data;
   generating absolute relevance training data based on the identified contradictions;
   generating another search model based on the base search model and the generated absolute relevance training data;
   generating a rank ordered search query result based on the received search query and the generated other search model; and
   transmitting the rank ordered search results to the client device for display.

15. The computer-readable storage device of claim 14, wherein a market comprises a grouping of end users having a shared characteristic.

16. The computer-readable storage device of claim 14, wherein the base search model comprises one or more Gradient Boosted Decision Trees (GBDT) derived from a set of absolute judgments.

17. The computer-readable storage device of claim 14, wherein generating absolute relevance training data includes evaluating the base search model for a document and modifying the result.

18. The computer-readable storage device of claim 14, wherein the base search model is derived from a set of absolute judgments ascribing a value to a document for a given search query.

19. The computer-readable storage device of claim 14, wherein identifying one or more contradictions further comprises:
   identifying a pair of documents in the pairwise relevance data wherein the relevance of the same pair of documents implied by the base search model is different from the relevance of the pair of documents indicated by the pairwise relevance data.

20. The computer-readable storage device of claim 14, wherein the received base search model is derived from query document pairs, each query document pair being associated with an absolute relevance judgment provided by a human editor.

* * * * *